(12) United States Patent
Hamada

(10) Patent No.: US 7,484,770 B2
(45) Date of Patent: Feb. 3, 2009

(54) CONNECTING STRUCTURE FOR PIPING MEMBERS

(75) Inventor: Takeshi Hamada, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 229 days.

(21) Appl. No.: 10/552,312

(22) PCT Filed: Apr. 9, 2004

(86) PCT No.: PCT/JP2004/005132

§ 371 (c)(1),
(2), (4) Date: Feb. 6, 2006

(87) PCT Pub. No.: WO2004/090409

PCT Pub. Date: Oct. 21, 2004

(65) Prior Publication Data

US 2008/0012290 A1 Jan. 17, 2008

(30) Foreign Application Priority Data

Apr. 10, 2003 (JP) .............................. 2003-107159

(51) Int. Cl.
*F16L 39/00* (2006.01)
(52) U.S. Cl. ................. 285/124.5; 285/124.4; 285/336; 285/370
(58) Field of Classification Search ............. 285/124.5, 285/124.3, 124.4, 363, 364, 365, 366, 367, 285/368, 336, 370
See application file for complete search history.

(56) References Cited

U.S. PATENT DOCUMENTS

| 4,082,324 | A | * | 4/1978 | Obrecht .................... 285/124.5 |
| 5,704,399 | A | * | 1/1998 | Hayashi et al. ............. 137/884 |
| 5,881,773 | A | * | 3/1999 | Lukas et al. ................ 137/884 |
| 6,237,634 | B1 | * | 5/2001 | Narita et al. ........... 137/625.27 |
| 6,733,044 | B2 | * | 5/2004 | Huang ..................... 285/124.1 |
| 6,832,788 | B2 | * | 12/2004 | Fukano et al. ........... 285/124.5 |
| 7,073,825 | B2 | * | 7/2006 | Takada et al. ............ 285/124.1 |
| 7,178,556 | B2 | * | 2/2007 | Reid et al. .................. 137/884 |
| 7,300,075 | B2 | * | 11/2007 | Ebskamp et al. ............ 285/208 |

FOREIGN PATENT DOCUMENTS

| JP | 63-84486 | 6/1988 |
| JP | 11-082850 | 3/1999 |
| JP | 2001-116155 | 4/2001 |

* cited by examiner

*Primary Examiner*—David E Bochna
(74) *Attorney, Agent, or Firm*—Jordan and Hamburg LLP

(57) ABSTRACT

A connecting structure for piping members facilitates connection thereof and ensures prevention of liquid leakage. A first piping member includes a first channel, and at least one first joint surface in which at least one first opening communicating with the first channel and a first annular groove are provided. A second piping member includes a second channel, and at least one second joint surface in which at least one second opening communicating with the second channel and a second annular groove are provided. A sleeve for connecting the first and second piping members includes a central bore. The sleeve includes a pair of inserting sections and a partition therebetween. The inserting sections are thinner radially as compared to the partition and are configured to accommodate at least one elastic body which provides a seal when the inserting sections are press-inserted into the first and second annular grooves.

13 Claims, 10 Drawing Sheets

(a)

(b)

(a)

(b)

( a )

( b )

(a)

(b)

CONNECTING STRUCTURE FOR PIPING MEMBERS

BACKGROUND OF THE INVENTION

1. Field of the Invention

The present invention relates to a connecting structure for piping members used for fluid transportation in various industries such as chemical, semiconductor, food, biochemistry, in particularly to a connecting structure for piping members being easy to connect and capable of maintaining good sealing performance over prolonged period.

2. Description of the Related Art

In conventional connecting structures integrating valve portions therein for use in various chemical lines and pure-water lines, connection has been made by using fittings integrated into a piping member such as valves and tubes between piping members. However, there have been problems in that the piping work for such a configuration is time-consuming and requires wider piping space.

As a means of solving the problems a manifold valve 101 integrating the valve portions shown in FIG. 9 has been used. The manifold valve 101 includes a main channel 102 provided inside the valve body 103, multiple communicating ports 104 vertical to the main channel 102, multiple valve chests opening upward in communication with the communicating ports 104, valve seats 106 located in place where the lower side of the valve chest 105 intersects the communicating port 104, and sub-channels (not shown) provided in the sides of the valve chests 105 in orthogonal direction with respect to the main channel 102 and the communicating port 104. Multiple driving sections 108 provided with the valve bodies 107 serve to open and close the valves utilizing the pressure of the working fluid and are fixed on the top of the valve body 103 with bolts and nuts (not shown) in relation to the respective valve chests 105. This forms a structure with multiple integrated valves. However, the manifold valve 101 is inferior in versatility, because its design and manufacture has to be adjusted to each particular requirements, i.e., increasing or decreasing the number of valve chests 105 and sub-channels. If the valve seat 106 is damaged even partly by accidental inclusions or similar events, requiring replacement of parts, the entire valve body 103 as well as the not affected parts have to be replaced, because of the integrated structure of the valve body 103. This poses problems because of the required extensive labor and high costs.

As means of solving the aforementioned problems, connecting structures of connecting openings of blocks, as shown in FIG. 10 has been proposed (refer to Japanese Unexamined Patent Application Publication No. 2001-116155). According to this connecting structure, a first connecting surface 109 is closely connected to a second connecting surface 110. An annular recess groove 111 is formed in the first connecting surface 109 and an annular projection 112 projects from the second connecting surface 110. On the periphery of the annular projection 112 an annular projection 115 with a head 113 and a tapered surface 114 are formed (refer to FIG. 10(a)). When the connecting surfaces are secured with securing members (not shown) such as bolts, the annular projection 112 is brought into close contact with the periphery of the opening and the annular projection 115 is fitted into the annular recess groove 111, while the tapered surface 114 of the annular projection 115 is brought into close contact with the inner periphery of the annular recess groove 111 (refer to FIG. 10 (b)).

In this connecting method, however, the connected portions consisting of the annular projection 112, the annular projection 115, and the annular recess groove 111 are kept tight at first because they are secured sufficiently with a securing member (not shown) such as a bolt and others. Yet, this does not address the problem that sealing performance deteriorates due to weakened crimping forces of the connected portion resulting from creep action caused by changes in fluid pressure and temperature over prolonged periods, thus rendering connected parts susceptible to separation due to looseness developing in securing members, resulting in leakage of fluid. The tendency becomes more pronounced with polytetrafluoroethylene (hereinafter referred to as PTFE) and tetrafluoroethylene perfluoroalkyl vinylether copolymer (hereinafter referred to as PFA) preferably used as sealing materials.

SUMMARY OF THE INVENTION

The present invention has the purpose of solving the problems encountered the prior art mentioned above. Its purpose is to provide a connecting structure for piping members that are easily connected and capable of surely preventing liquid from leaking even if sealing performance deteriorates due to weakening crimping forces of the connected portion due to creep action caused by changes in fluid pressure and temperature over a prolonged period and thus renders connected parts susceptible to separation due to looseness developing in the securing members.

The composition of piping members for solving the above problems in the present invention is described below with reference to FIGS. 1 to 3. In a first embodiment of the present invention, the structure is characterized in that a first piping member 1 having a channel therein, the first piping member 1 having at least one of a first joint surface 8 on the periphery of which at least one of a first opening 7 in communication with the channel and with a first annular groove 6 is provided and a second piping member 2 having a channel therein, the second piping member 2 having at least one of a second joint surface 11 on the periphery of which at least one of a second opening 10 in communication with the channel and with a second annular groove 9 is provided are connected together in a sealed state through a roughly cylindrical sleeve 3, wherein a thinner-walled sleeve 3 with flanges 23, on both ends thereof on the periphery of which elastic O-rings 26 and 27 are fitted, is press inserted into the first and second annular grooves 6 and 9.

In a second embodiment of the present invention, the structure is characterized in that the first and second piping members 1 and 2 are connected together by connecting members 30, 31, 69, and 70 for connecting the first and second joint surfaces together or a connecting member 85 for connecting the top or undersides of the first and second piping members together.

In a third embodiment of the present invention, the structure is characterized in that joint fitting portions 14 and 15 are formed in the first and second joint surfaces 8 and 11 of the first and second piping members 1 and 2 respectively and the members are connected through joints 30 and 31 fixed into the fitting portions 14 and 15 with pins 34, 35, 36, and 37.

In a fourth embodiment of the present invention, the structure is characterized in that the first piping member 1 and/or the second piping member 2 are any of a valve, fitting, mixer, pump, flowmeter, and various types of sensors.

DESCRIPTION OF THE PREFERRED EMBODIMENTS

The preferred embodiment of the present invention is described in detail below with reference to the drawings. It is to be understood that the present invention is not limited to these embodiments.

Figure 1:
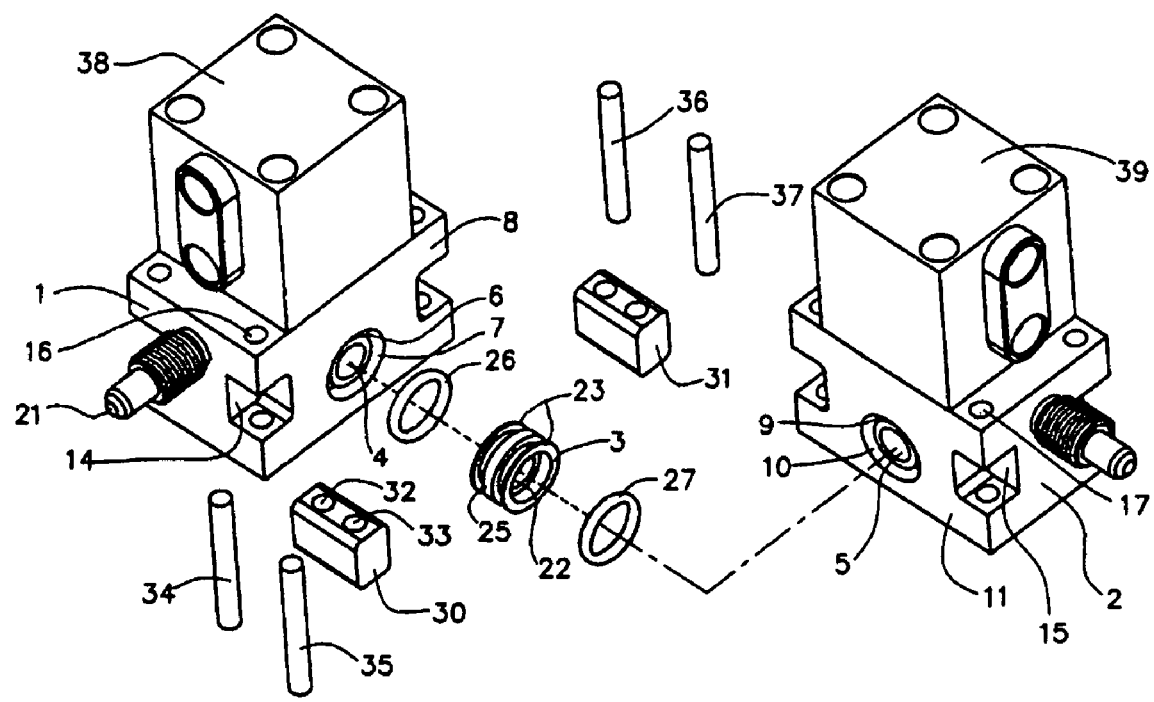
FIG. 1 is an exploded perspective view showing a connecting structure for piping members according to a first embodiment of the present invention.
Figure 2:
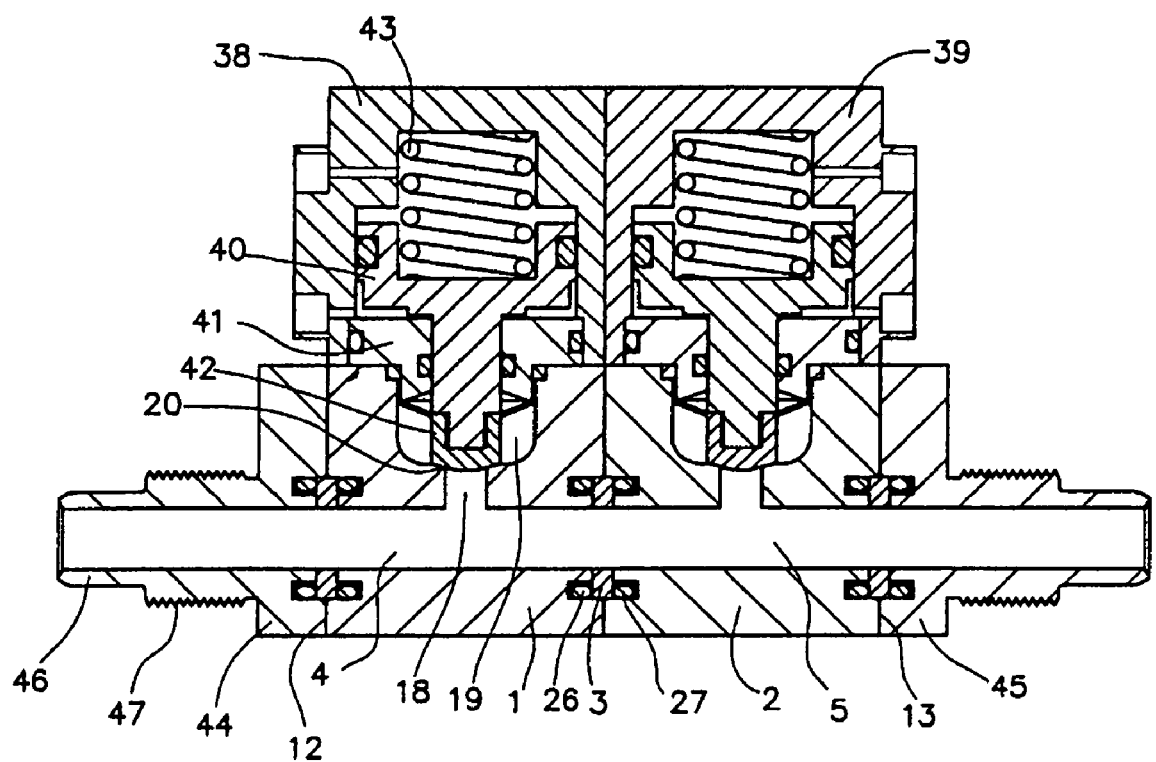
FIG. 2 is a vertical section showing a first embodiment of the present invention.
Figure 3:
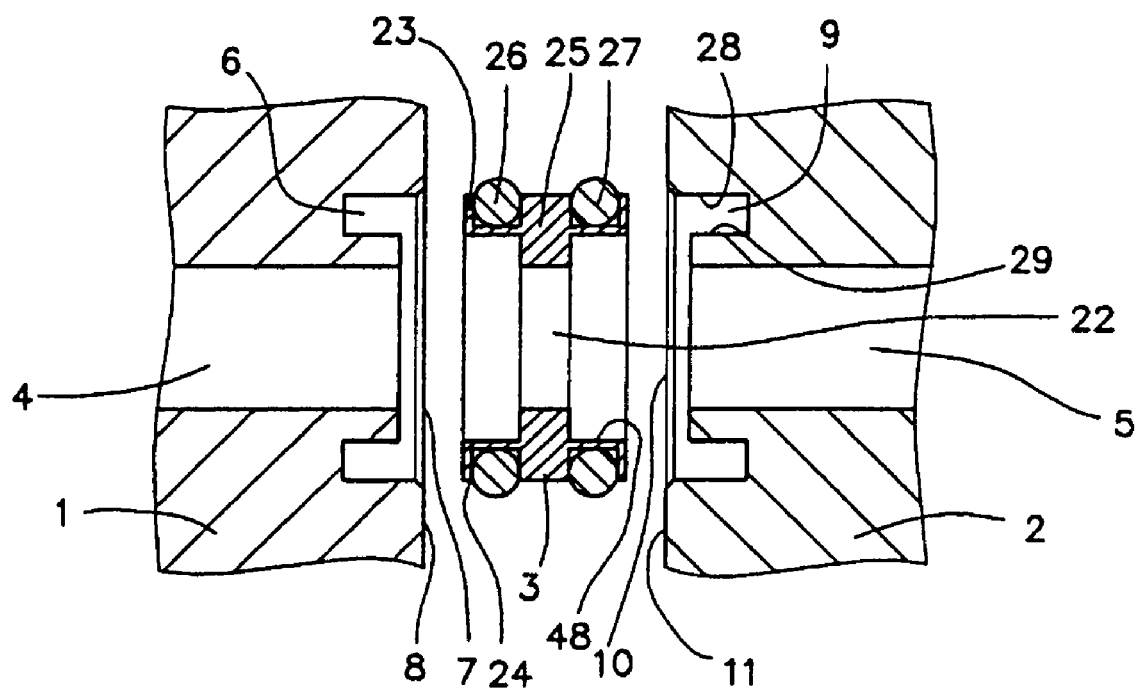
FIGS. 3 (a) and 3 (b) are enlarged vertical sections of principal parts according to a first embodiment of the present invention; the former being the section before they are connected, and the latter after they are connected.
Figure 3:
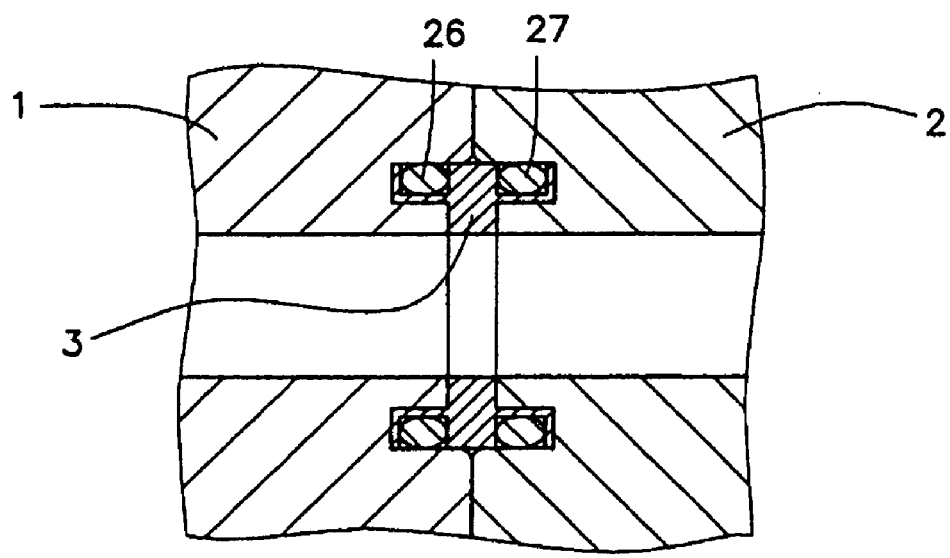

A connecting structure for piping members in the first embodiment of the present invention is described below with reference to the FIGS. 1 to 3.

In the figures the reference numeral 1 refers to a valve body as a first piping member made of PTFE, inside which a first channel 4 is provided through the first valve body 1, and has an annular groove 6 on the periphery of the side to which a second valve body described later is connected, equipped with a first joint surface 8 on which a first opening 7 in communication with the provided first channel 4, and is equipped with a similar joint surface 12 on the opposite side. A notch-shaped fitting section 14 is formed on both ends (left and right) of the first joint surface 8. Through holes 16 penetrating the fitting portions 14 respectively are provided vertically at the four corners of the body. At the center inside the body a communicating port 18 is provided vertically with respect to the first channel 4 and a valve chest 19 with its top opening is provided in communication with the communicating port 18. A valve seat 20 lies on the periphery of the communicating port 18 at the bottom of the valve chest 19. On the side of the valve chest 19 a sub-channel 18 is provided in an orthogonal direction with respect to the first channel 4 and the communicating port 18. The first channel 4 is provided in a straight line with the first valve body 1 penetrating the present embodiment. Alternatively, it may be bent at a right angle at a point intersecting with the communicating port 18, or it may be provided on one side of the first valve body 1 by opening it without penetration, that is to say, this structure imposes no special limitations on the configuration of the channel. Furthermore, although the sub-channel 21 is provided in orthogonal direction with respect to the first channel 4, an opening in communication with the sub-channel 21 can be provided on the first joint surface 8 in the same direction with the first opening 7. In that case, however, the second valve body to be connected needs to have a similar opening. The fitting section 14 has in the present embodiment a notch shape, but it can also be shaped as a recess on the joint surface.

The reference numeral 2 refers to a valve body as a second piping member made of PTFE, inside which a second channel 5 is provided through the second valve body 2, having an annular groove 9 on the periphery of the side to which the first valve body is connected and is equipped with a second joint surface 11 on which a second opening 10 in communication with the second channel 5 is provided, and is further equipped with a similar joint surface 13 on the opposite side. The second valve body is similar to the first valve body in inner structure.

The reference numeral 3 refers to a roughly cylindrical sleeve made of PTFE, at the center of which a through hole 22 having approximately the same bore as the first and second channels 4 and 5 of the first and second valve bodies 1 and 2 is provided in coaxial direction of the first and second channels 4 and 5. Inserting sections 24 with flanges 23 and a partition 25 are provided at both ends and at the center of the sleeve respectively. The inserting sections 24 are formed to be thinner-walled as compared to the partition 25 (refer to FIG. 3). The inserting sections 24 are press inserted into the first and second annular grooves 6 and 9 with elastic O-rings 26 and 27 fitted between the flange 23 and partition 25 compressed flat in radial direction. The sleeve 3 is sealed and fixed with, and held between the first and second openings 7 and 10. The outer diameters of flange 23 and partition 25 are almost the same as the outside 28 of the first and second annular grooves 6 and 9. The inner diameters of the inserting sections 24 are the same as the insides 29 of the first and second annular grooves 6 and 9. The length between the end surfaces of the sleeve 3 is designed to be equal to the total dimensions of depth at the bottom of the first annular groove 6 in the tube axis from the first joint surface 8 and depth at the bottom of the second annular groove 9 in the tube axis from the second joint surface 11. That is to say, sleeve 3 is adapted to be inserted and fitted into the first and second annular grooves 6 and 9, and brought into close contact with the insides 29 of the grooves by the elastic action of the O-rings 26 and 27.

The reference numeral 30 is a joint of polypropylene (hereinafter referred to as PP) and has two through holes 32 and 33. The through holes 32 and 33 of the joint 30 are formed to have almost the same diameter as the through holes 16 and 17 of the first and second valve bodies 1 and 2 and designed to be coaxial with the through holes 16 and 17 when the joint 30 is fitted into the fitting portions 14 and 15. Both valve bodies 1 and 2 are connected and fixed together in such a manner that both sides of the joints 30 are fitted into respective fitting portions 14 and 15 of the first and second joint surfaces 8 and 11 and the then the cylindrical metallic pins 34, 35, 36, and 37 formed to be approximately the same as the through holes 16, 17, 32, and 33 in diameter are inserted into the through holes 16 and 17 of both valve bodies 1 and 2 and through holes 32 and 33 of the joint 3. The size and shape of the fitting portions 14 and 15 are not limited unless they affect the actions of both valves 1 and 2, and at the same time the shape of the joint 30 is not limited as long as it can be inserted into the fitting portions 14 and 15 even if it protrudes from both valve bodies 1 and 2. Flanges can be provided on the upper sections of the pins 34, 35, 36, and 37 to facilitate disassembly of the connection portion. The pins 34, 35, 36, and 37 can be screwed to be fitted into the joint. The material of the pins 34, 35, 36, and 37 may be any of metals such as aluminum, iron, copper and alloy and may be resin as of engineering plastic unless strength poses a problem. The joint 31 is made of PP and is the same as the joint 30 in structure.

The reference numeral 38 is a driving section of PP formed with an internal cylinder. The reference numeral 40 is a piston of PP, and is inserted and fitted so that it can slide up- and downward into the cylinder of the driving section 38. The reference numeral 41 is a valve body presser of PP having a through hole therein, into which the bottom of the piston 40 is inserted and fitted so that it can slide up- and downward. Moreover the upper part of the valve body presser 41 is inserted and fitted into the lower part of the cylinder of the driving section 38 and its lower part is inserted and fitted into the valve chest 19 of the first valve body 1, thereby holding the valve body presser 41 between the driver 38 and the first valve body 1. The reference numeral 42 is a valve body of PTFE with a membrane section, its periphery being held between the valve body presser 41 and the first valve body 1. The piston 40 is screwed into the central upper part of the valve body 42 . The valve body 42 can be moved up- and downward by the vertical motion of the piston 40. The reference numeral 43 is a metallic spring held between the ceiling surface of the cylinder inside the driving section 38 and the upper part of the piston 40 and fixed there between the piston 40 energized normally downward. That is to say, the valve body 42 joined to the piston 40 is also energized in downward direction and brought into contact with the valve seat 20 of the first valve body 1 by pressurizing. The reference numeral 39 is a driving section of PP and is similar to the driving section 38 in structure.

The reference numerals 44 and 45 are pipe fittings made of PTFE. One end of the pipe fitting has a connecting section on which a pipe connecting section 46 and a male screw section 47 are integrally provided, the other end is structurally the same as the first joint surface 8. The pipe fittings 44 and 45 are coupled with the first and second valve bodies 1 and 2 respectively. The connection method for them is the same as that for the first and second valve bodies 1 and 2.

Below the function of the first embodiment with above structure is described.

In the figures, the flow of fluid into the first and second channels 4 and 5 fills the channels 4 and 5 and at the same time attempts to outflow through the interstice between the first and second valve bodies 1 and 2, and the sleeve 3. The sleeve 3, however, is press inserted into the first and second annular grooves 6 and 9 and thus sealed and held there, preventing the fluid from leaking from the connected portion between the sleeve 3 and the first and second valve bodies 1 and 2.

The use of fluororesin such as PTFE as material for the connecting portion between sleeve 3 and the first and second valve bodies 1 and 2 as shown in the present embodiment may generate creep and strain in sleeve 3 and both valve bodies 1 and 2 by the creep action of the material itself caused by variation in fluid pressure and temperature after prolonged use and thus lead to the formation of interstices between the valve bodies. Even if such interstices form between the first and second valve bodies 1 and 2 by creep and strain, fluid will be securely blocked with the sealing section of the insides 29 of the first and second annular grooves 6 and 9 and the inside 48 of the inserting section 24 of the sleeve 3, preventing the fluid from leaking, because the inside 48 of the inserting section 24 of the sleeve 3 is pressed against the former and ensures a close contact between the insides 29 of the first and second annular grooves 6 and 9 through the function of the elastic O-rings 26 and 27. Furthermore, sealing performance can be maintained, because the first and second valve bodies 1 and 2 are connected together with the pins 34, 35, 36, and 37, and joints 30 and 31 so that the piping members do not separate from each other.

The focused pressure of the inside 48 of the sleeve 3 against the insides 29 of the first and second annular grooves 6 and 9 results in a close contact with the O-rings 26 and 27 fitted into the sleeve 3, and the focused pressure of flange 23 of the sleeve 3 results in a close contact with the bottom of the first and second annular grooves 6 and 9, thereby providing excellent sealing performance and permits to maintain the elastic function of the sleeve 3 over longer periods.

The sleeve 3 is press inserted into the first and second annular grooves 6 and 9 with the O-rings 26 and 27 compressed flat in radial direction relative to the axis of the first and second channels 4 and 5. Thus the flow of fluid into the first and second channels 4 and 5 exerts a separating force on both joint surfaces 8 and 11 of both valve bodies 1 and 2 through hydrostatic pressure, thereby tending to reduce the elastic function in axial direction of the O-rings 26 and 27. In radial direction, however, a constant elastic function can be maintained even if hydrostatic pressure increases, so that a good long-term sealing properties can be maintained against the creep of both valve bodies 1 and 2. Furthermore, this structure ensures that excellent sealing properties can be maintained even if the first and second channels 4 and 5 are subjected to higher hydrostatic pressure.

Even if a crack develops in sleeve 3 has due to accidental inclusions and poor contact, resulting in liquid leak from the sleeve 3, the outsides 28 of the first and second annular grooves 6 and 9 also assist the sealing because the O-rings 26 and 27 are compressed flat in radial direction in relation to the axis of the channels, thus a liquid leak can be eventually blocked between the O-rings 26 and 27 and the outsides 28 of the first and second annular grooves 6 and 9, so that fluid will never leak outside. Fluororubber of excellent heat and chemical resistances is the preferable material for the O-rings 26 and 27, but any material may be used, as long as its properties suite the conditions of the application. An elastic body such as a short tubular packing or rubber plastic can be used instead of the O-rings 26 and 27.

The function of the driving section 38 is described below with reference to FIG. 2. In a normal state the piston 40 in the driving section 38 is pushed downward by the repulsive force of the spring 43 and the valve body 42 joined to the piston 40 is brought into contact with the valve seat 20 of the first valve body 1 by pressurizing, so that fluid flowing through the first channel 4 will not flow into the valve chest 19 and the sub-channel 21 through the communicating port 18. The flow of working fluid, for example compressed air, into the interstices formed between the piston 40 and valve body presser 41 causes the piston 40 to rise by the pressure of the working fluid and at the same time the valve body 42 joined to the piston 40 leaves the valve seat 20. Thus the fluid flowing through the first channel 4 is supplied to the valve chest 19 and the sub-channel 21 through the communication port 18. The exhaust of the working fluid causes the piston 40 to be pushed downward again by the spring 43, bringing the valve body 42 into contact with the valve seat 20, stopping the supply of the fluid to the sub-channel 21. The function of the driving section 39 is also the same as that of the driving section 38, so that its description is omitted here.

The connection method in the present embodiment is described below with reference to FIGS. 1 to 3.

Firstly, the O-rings 26 and 27 are fitted on the periphery of the sleeve 3. One inserting section 24 of the sleeve 3 is press inserted into the first annular groove 6 of the first valve body 1, and then the other inserting section 24 is press inserted into the second annular groove 9 of the second valve body 2, thereby joining the first and second joint surfaces 8 and 11 to each other. In this junction the use of the sleeve 3 can provide the effect of centering of the first and second channels 4 and 5 of both valve bodies 1 and 2. Secondly, the joints 30 and 31 are inserted into the inserting sections 14 and 15, the pins 34 and 36 are inserted and fitted into the through hole 16 of the first valve body 1 and the through hole 32 of the joints 30 and 31, and then pins 35 and 37 are inserted and fitted into the through hole 17 of the second valve body 2 and the through hole 33 of the joints 30 and 31, thereby coupling the first and second valve bodies 1 and 2 together. As described above, it is extremely easy to connect the piping members using the present embodiment without requiring any tools for the connection.

Figure 4:
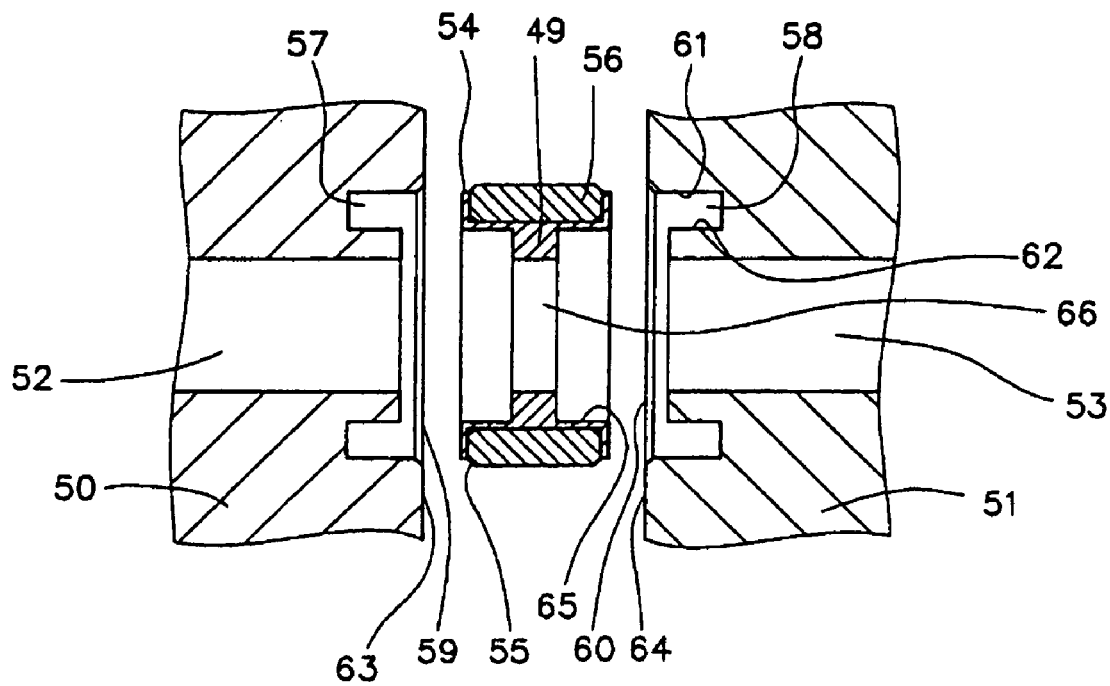
FIGS. 4 (a) and 4 (b) are enlarged vertical sections of principal parts according to a second embodiment of the present invention; the former being the section before they are connected, and the latter after they are connected.
Figure 4:
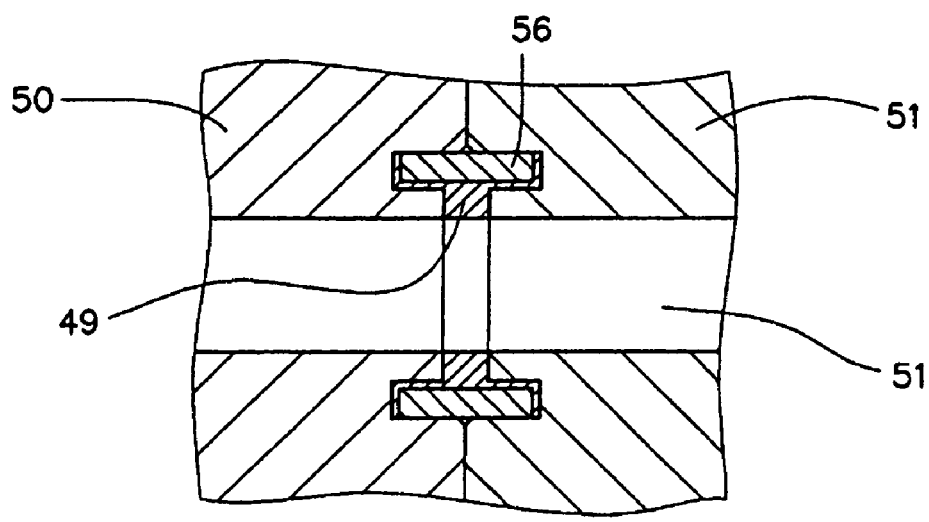

Below a connecting structure for piping members according to the second embodiment of the present invention is presented with reference to FIG. 4.

The reference numeral 49 is a basically cylindrical sleeve made of PTFE, at the center of which a through hole 66 having roughly the same bore as the first and second channels 52 and 53 of the first valve body 50 of PTFE as a first piping member and the second valve body 51 of PTFE and 51 as a second piping member is provided in coaxial direction of the first and second channels 52 and 53. An inserting section 55 with a flange 54 is provided at both ends of the sleeve. The inserting sections 55 are formed to be thinner-walled (refer to FIG. 4). The inserting section 55 is press inserted into the first and second annular grooves 57 and 58 with a short tubular elastic packing 55 fitted onto the periphery of the sleeve and compressed flat in radial direction. The sleeve 49 is sealed and held between the first and second openings 59 and 60. The outer diameter of flange 54 is almost the same as the outside 61 of the first and second annular grooves 57 and 58. The inserting section 55 has the same inner diameter as the inside 62 of the first and second annular grooves 57 and 58. The length between the end surfaces of the sleeve 49 is designed to be equal to the total dimensions of depth at the bottom of the first annular groove 57 in tubular axial direction from the first joint surface 63 and depth at the bottom of the second annular groove 58 in tubular axial direction from the second joint surface 64. That is, the sleeve 49 is inserted and fitted into the first and second annular grooves 57 and 58 and brought into close contact with the insides 62 of the first and second grooves 57 and 58 by the elastic action of the packing 56. Other structures of this embodiment are the same as those in the first embodiment, so that their description is omitted here.

The function of the second embodiment with above structure is described below.

Since the inside 65 of the sleeve 49 is pressed in concentrically against and thus brought into close contact with the insides 62 of the first and second annular grooves 57 and 58 with the packing 56 as an elastic body fitted to the sleeve 49, and at the same time the flange 54 of the sleeve 49 is pressed in concentrically against and thus brought into close contact with the bottom of the first and second annular grooves 57 and 58, resulting in extremely good sealing properties and in effect can maintain the elastic function of the sleeve 49 over prolonged periods.

Furthermore, the sleeve 49 is press inserted into the first and second annular grooves 57 and 58 with the packing 56 compressed flat in radial direction in relation to the axis of the first and second channels 52 and 53. Thus, the flow of fluid into the first and second channels 52 and 53 exerts a separating force on both joint surfaces 63 and 64 of both valve bodies 50 and 51 by the action of hydrostatic pressure, tending to decrease the elastic effect in axial direction of the packing 56. In radial direction, however, a constant elastic action can be maintained even if hydrostatic pressure increases, so that a good sealing performance can be maintained against the creep of both valve bodies 50 and 51 over prolonged periods. Furthermore, this structure permits good sealing properties to be maintained even if the first and second channels 52 and 53 are subjected to high hydrostatic pressure.

Even if the sleeve 49 is cracked due to accidental inclusions and poor contact, resulting in liquid leak from the sleeve 49, fluid can eventually be blocked between the packing 56 and the outsides 61 of the first and second annular grooves 57 and 58 in the same way as in the first embodiment, so that fluid will never leak.

Figure 5:
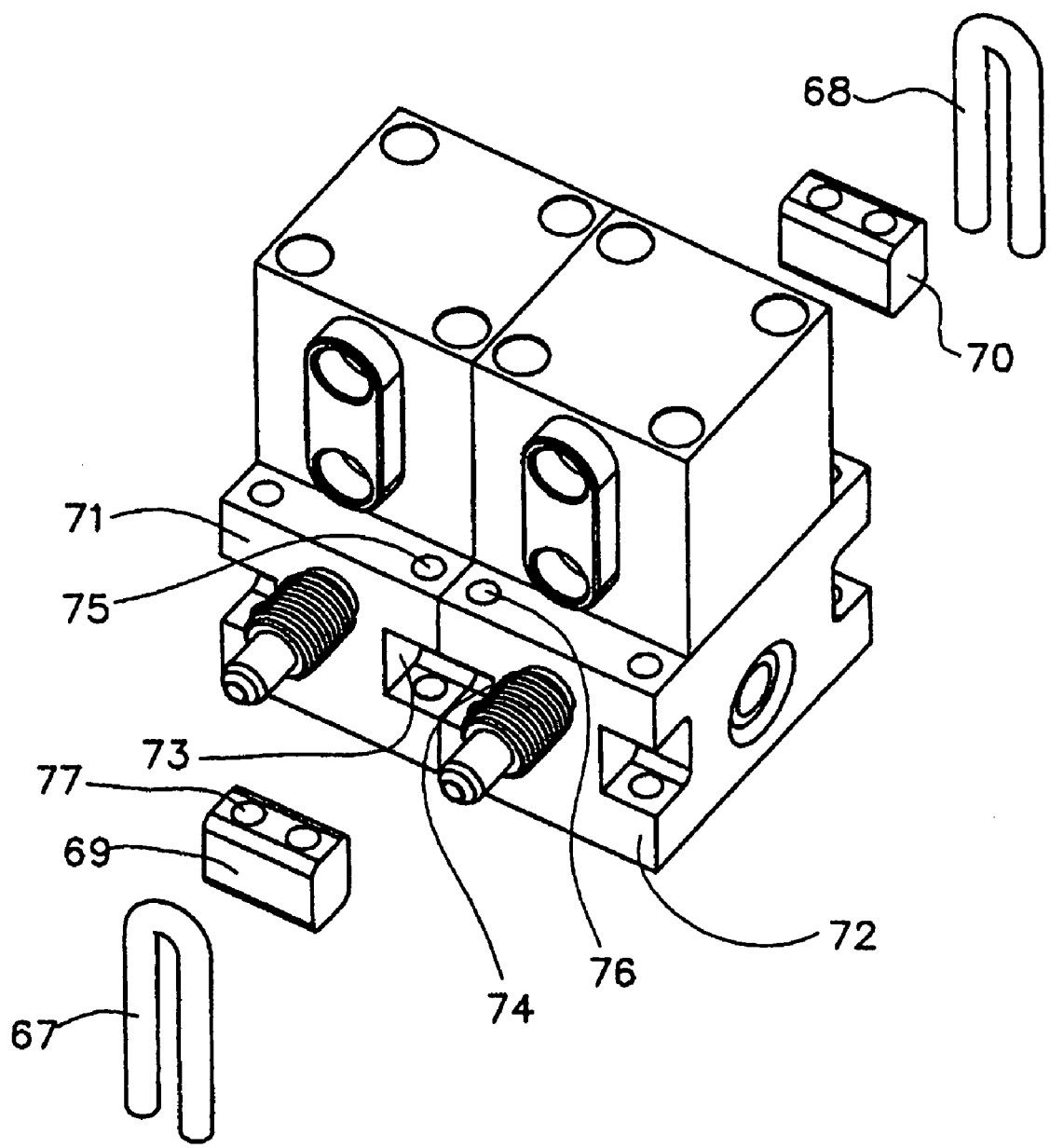
FIG. 5 is a perspective view showing connecting members according to a third embodiment of the present invention.

Below a connecting structure for piping members according to the third embodiment of the present invention is described with reference to FIG. 5.

The reference numerals 67 and 68 are U-shaped metallic pins with a circular cross-section. Joints 69 and 70 of PP are fitted into and held by fitting portions 73 and 74 formed in the joint surfaces 72 of the valve body 71 made of PTFE as a first piping member and of the valve body 72 of PTFE as a second piping member. Both valve bodies are coupled and fixed to each other through insertion into the through holes 75 and 76 of both valve bodies 71 and 72 and two through holes 77 of the joints 69 and 70 the pins 67 and 68 with the same diameter as the through holes. Other structures and functions of the present embodiment are the same as those of the first embodiment, so that their description is omitted here.

Figure 6:
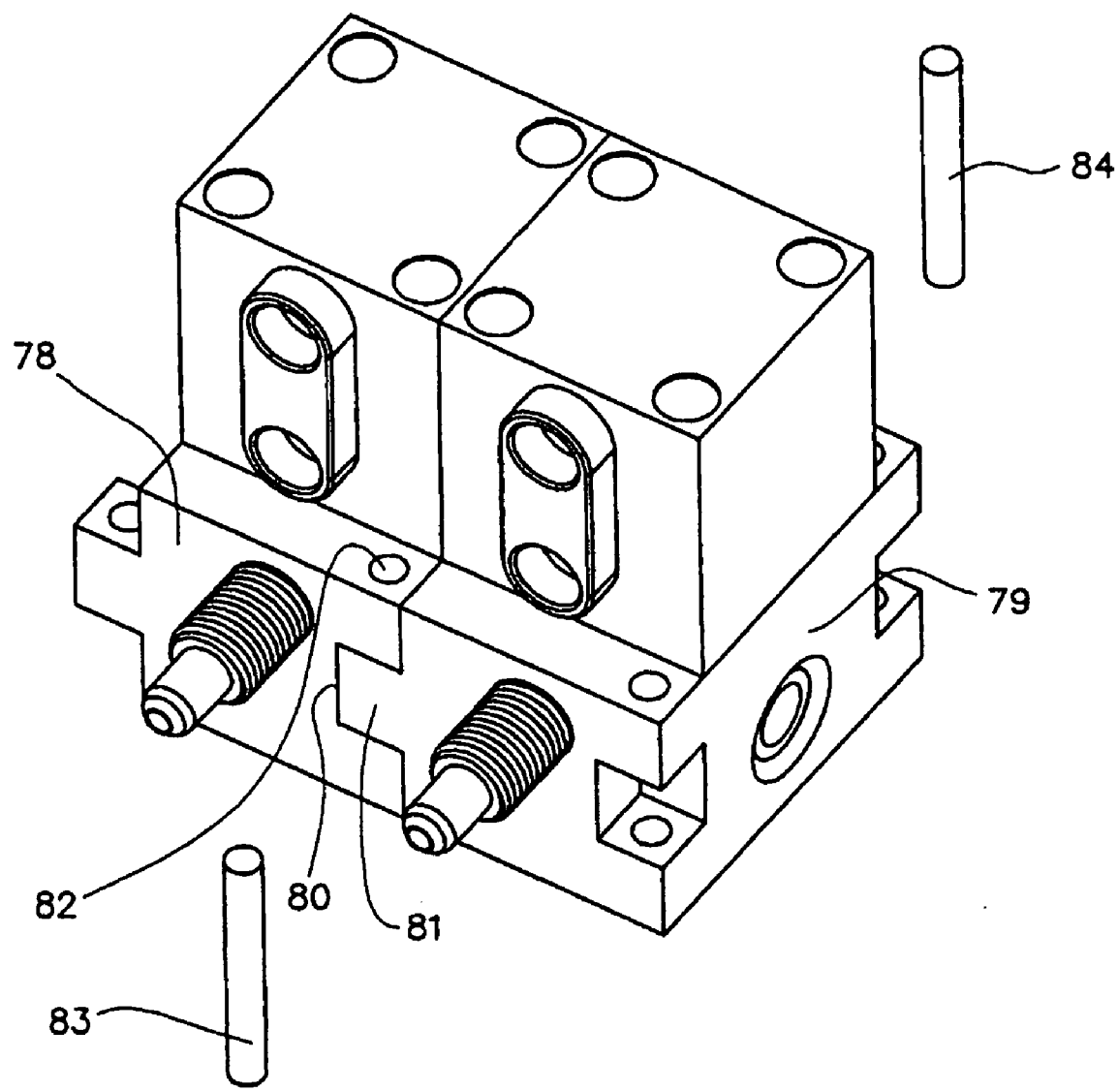
FIG. 6 is a perspective view showing connecting members according to a fourth embodiment of the present invention.

Below the structure of the connecting members in the fourth embodiment according to the present invention is described with reference to FIG. 6.

A recess 80 is provided on a joint surface of the valve body 78 of PTFE as a first piping member. A salient 81 fitted into the recess 80 is provided on the joint surface of the valve body 79 made of PTFE as the second piping member to be connected thereto. A through hole 82 penetrating the recess 80 and the salient 81 fitted therein is provided in vertical direction. Cylindrical metallic pins 83 and 84 with the same diameter as the through hole 80 are inserted into through holes 80, thereby connecting and fixing both valve bodies 78 and 79 together. Other structures and functions of the present embodiment are the same as those of the first embodiment, so that their description is omitted here.

In the first to fourth embodiments described above, connecting members for connecting the valve bodies together do no connect multiple piping members, that is to say, they are individually and independently provided between the valve bodies. Thus, even if a valve body located between other parts needs replacing due to defects after for example multiple valve bodies are arranged in series and connected to one another, it is possible to replace that valve body in question by remove only connecting members. In that way, it is easy to replace it without requiring replacement of all connected valves (manifold valve) collectively and thereby allows to reduce replacement costs.

Figure 7:
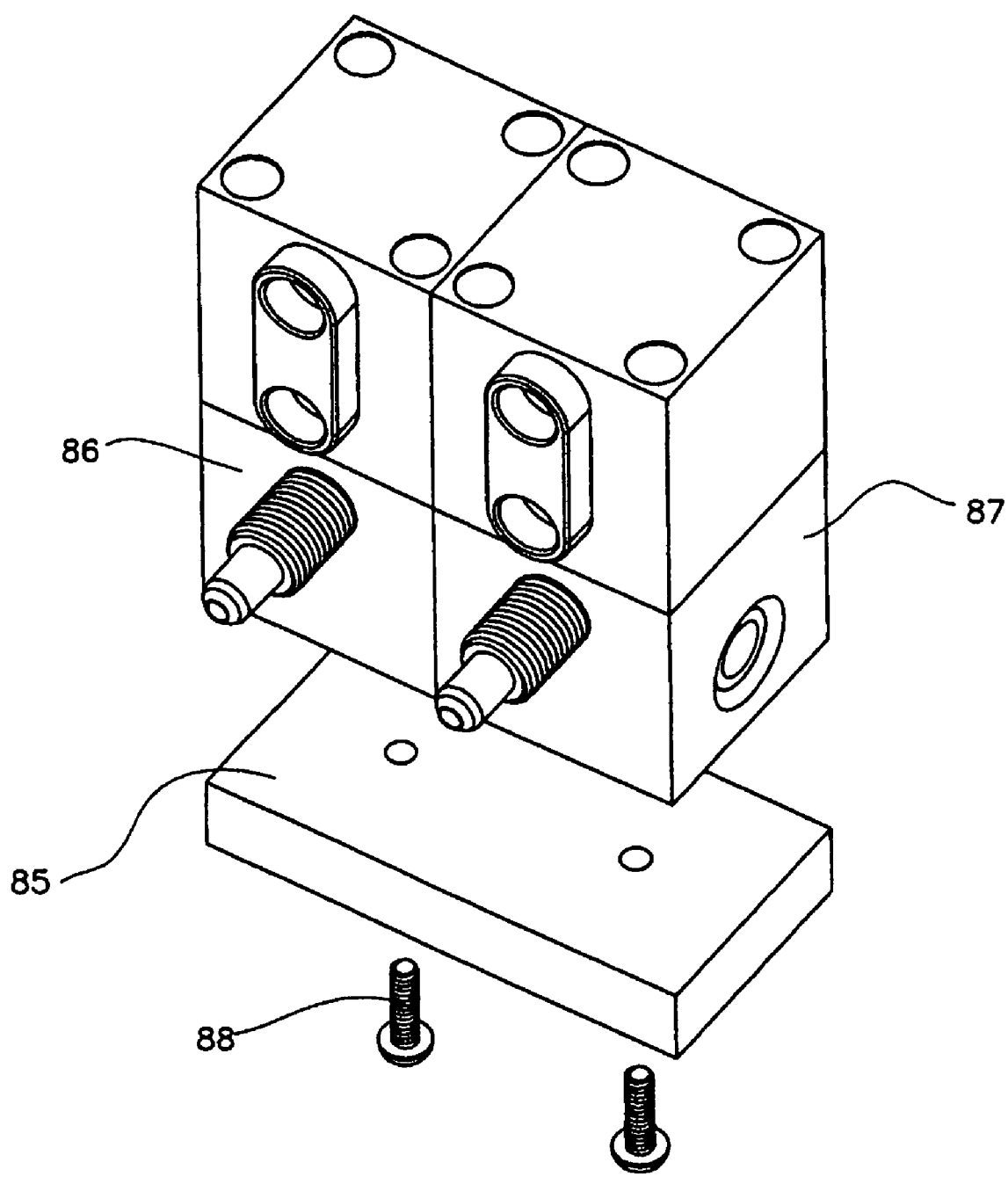
FIG. 7 is a perspective view showing connecting members according to a fifth embodiment of the present invention.

Below the structure of the connecting members in the fifth embodiment of the present invention is described with reference to FIG. 7.

The reference numeral 85 is a plate. The plate 85 is located at the underside of valve body 86 made of PTFE as a first piping member and valve body 87 made of PTFE as a second piping member. Both valve bodies 86 and 87 are connected and fixed to each other by fixing the valves 86 and 87 on the plate 85 with bolt 88. Other structures and functions of the present embodiment are the same as those of the first embodiment, so that their description is omitted here. In this embodiment the undersides of the valves 86 and 87 are connected together with the plate 85, but the invention is not limited to this connecting method. For example, it would be equally acceptable to connect the upper sides of the valves.

Figure 8:
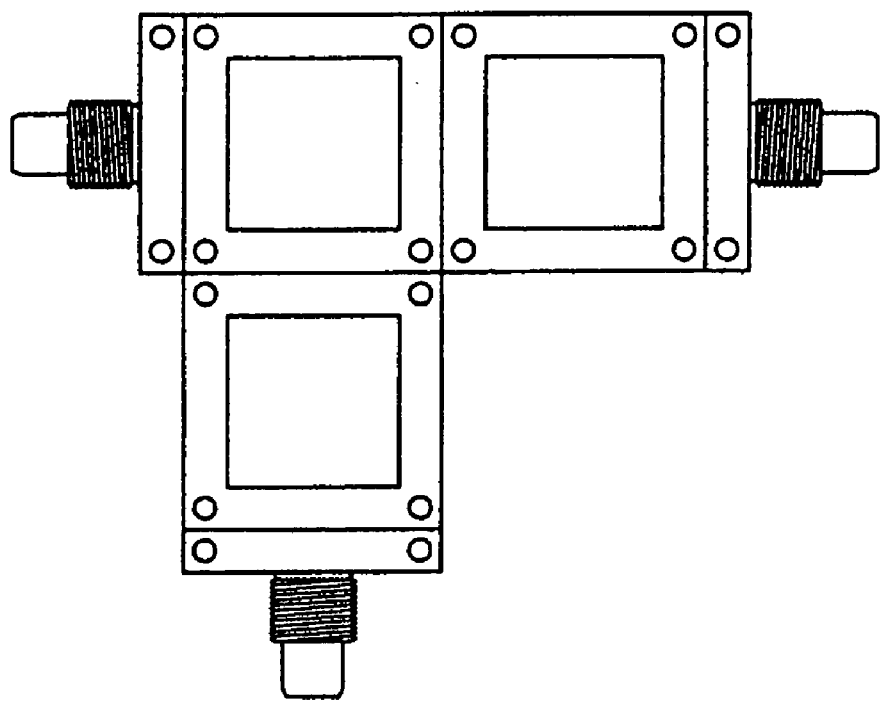
FIG. 8 is a plan view showing connecting members according to other embodiments of the present invention.
Figure 8:
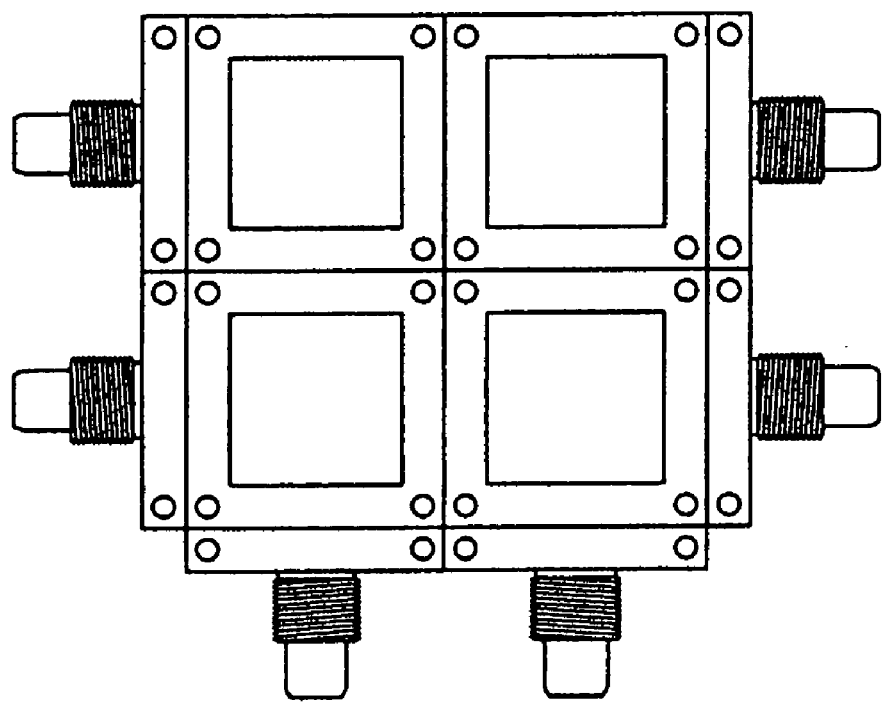
Figure 9:
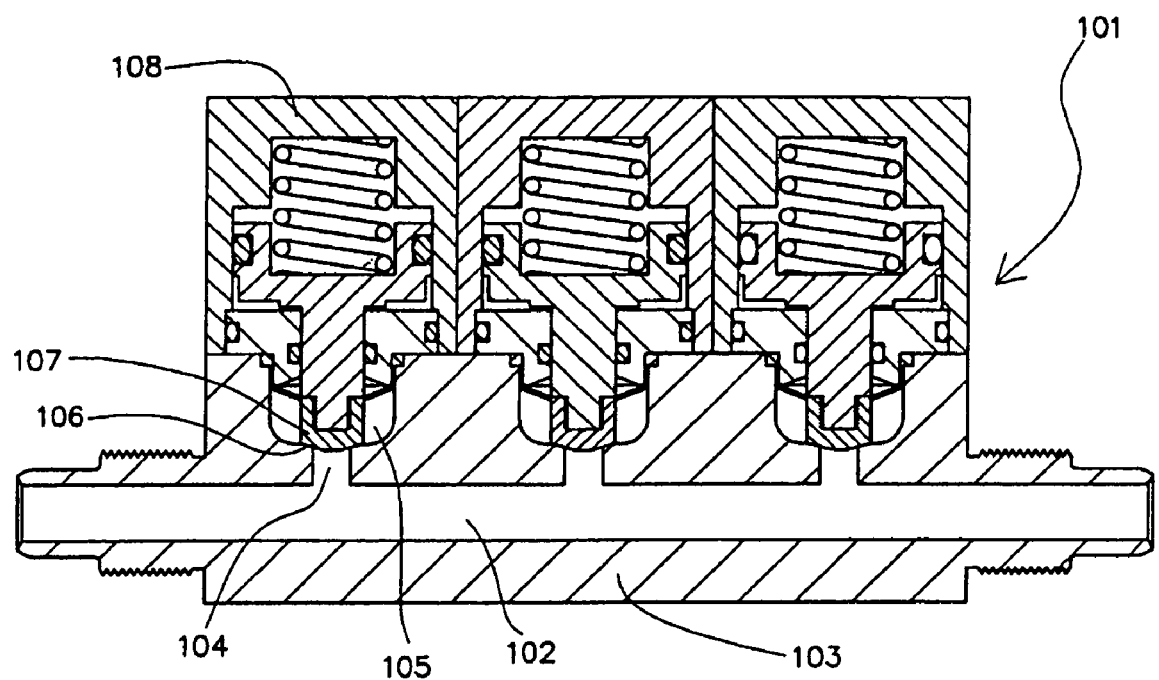
FIG. 9 is a vertical section showing a manifold valve as described in the prior art.
Figure 10:
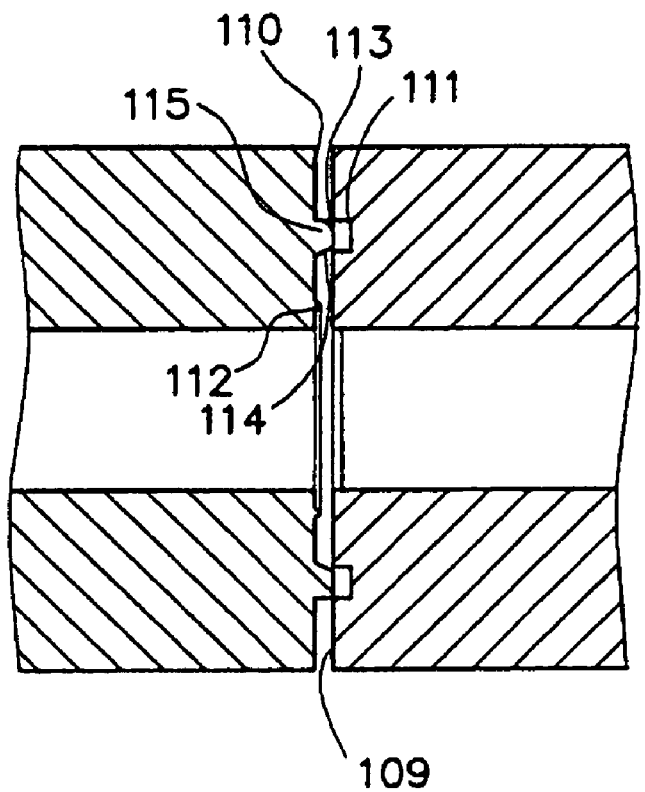
FIG. 10 a vertical section of principal parts showing how to connect the openings of blocks as described in the prior art.
Figure 10:
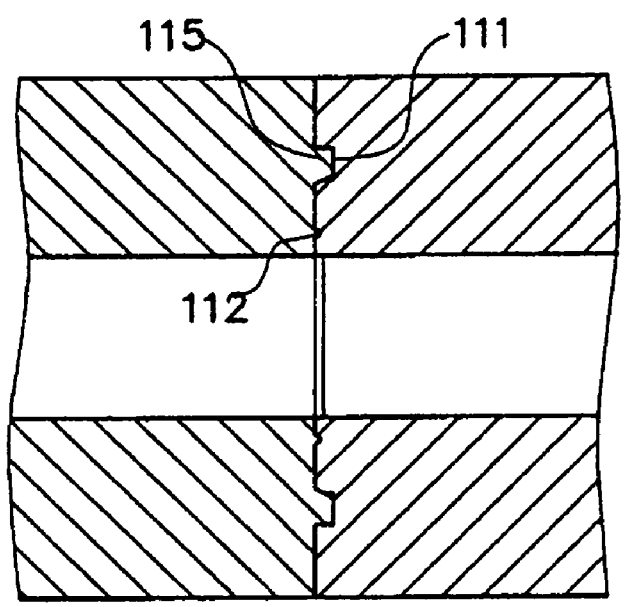

In the present embodiment two valve bodies are connected, however, three valves may be connected as shown in FIG. 8 (*a*). In that case, a joint for connecting three valves needs three or more through holes. Similarly, four valves can be connected as shown in FIG. 8 (b). In that case, however, a joint for connecting four valves needs four or more through holes. The present embodiments of the invention describe the use of valves and fittings as connected piping members, however, valves, fittings, mixers, pumps, flowmeters, and various types of sensors may also be used as piping members. The invention does not impose any particular limitations regarding the quantity of connected piping members, direction of connection, and combination of piping members.

The invention relates to the structures described above. Application of these structures provides the following-excellent effects:

(1) Fitting an elastic body on the periphery of the thinner-walled sleeve causes the inside of the sleeve to be pressed in concentrically against and brings it into close contact with the inside of the first and second annular grooves, thereby causing the flange of the sleeve to be pressed in concentrically against and brings it into close contact with the bottoms of the first and second annular grooves. That allows the structure to resist high hydrostatic pressure and provides extremely good sealing performance.

(2) Even if the sleeve is cracked due to accidental inclusions and poor contact, resulting in liquid leak from the sleeve, the outsides of the first and second annular grooves are sealed because the elastic bodies are compressed flat in radial direction in relation to the axis of the channels, thus liquid leaking from between the elastic bodies and the first and second annular grooves can be eventually blocked.

(3) Press-inserting the elastic bodies into the grooves while compressed flat in radial direction permits maintaining an elastic action even if creep or strain is generated in the piping members by changes in pressure and fluid temperature over prolonged periods, thereby maintaining excellent sealing performance.

(4) Connection work is easy. Connecting members for connecting the valve bodies together do no connect multiple piping members, that is to say, they are individually and independently provided between the valve bodies. Thus, even if a valve body located between other parts replacing due to defects after for example multiple valve bodies are arranged in series and connected to one another, it is possible to remove that valve body in question by removing only the connecting members. In that way, it is easy to replace it without requiring to replace all connected valves (manifold valves) collectively and thereby permits to reduce replacement costs.

(5) Since it is not required to place fittings and tubes between piping members, piping space can be saved and the piping work is simplified and thereby permits to reduce replacement costs.

What is claimed is:

1. A connecting structure for piping members, comprising:
    a first piping member having a channel therein, the first piping member having at least one first joint surface which includes at least one first opening in communication with said channel, said at least one first joint surface further including a first annular groove therein;
    a second piping member having a channel therein, the second piping member having at least one second joint surface which includes at least one second opening in communication with said channel, said at least one second joint surface further including a second annular groove therein; and
    a sleeve including a partition and inserting sections which are radially thinner than said partition and which are disposed on either side of said partition, said inserting sections including flanges on both ends thereof between which at least one elastic body is fitted such that said inserting sections each is press insertable into a respective one of said first and second annular grooves.

2. A connecting structure for piping members according to claim 1, wherein the first and second piping members are connected together by connecting members for connecting the first and second joint surfaces together or a connecting member for connecting upper or undersides of the first and second piping members.

3. A connecting structure for piping members according to claim 1, wherein joint fitting portions are formed in the first and second joint surfaces of the first and second piping members respectively and the members are connected through joints fixed into the fitting portions with pins.

4. A connecting structure for piping members according to any one of claims 1 to 3, wherein at least one of the first piping member or the second piping member is at least one of a valve, fitting, mixer, pump, flowmeter or various types of sensors.

5. A connecting structure for piping members, comprising:
    a first piping member including a first joint surface and a second piping member including a second joint surface, said first and second joint surfaces facing one another when the first and second piping members are mutually connected, the first piping member including a first channel extending therethrough, the first joint surface including a first recess communicative with said channel and a first annular groove defined by a first radially inward wall and a first radially outward wall, and the second piping member including a second channel extending therethrough, the second joint surface including a second recess communicative with said channel and a second annular groove defined by a second radially inward wall and a second radially outward wall; and
    a sleeve comprised of a pair of inserting sections and a partition being disposed therebetween, said partition including through hole, said inserting sections including flanges at respective ends thereof for accommodating and retaining at least one elastic body therebetween, each of said inserting sections being configured for reception in a respective one of said first and second annular grooves.

6. A connecting structure for piping members according to claim 5, wherein:
    the at least one elastic body includes two elastic bodies; and
    said partition and said flanges collectively define a pair of grooves therebetween for accommodating the two elastic bodies.

7. A connecting structure for piping members according to claim 6, wherein outer diameters of the flanges and the partition approximate a corresponding diameter of each of said first and second radially outward walls.

8. A connecting structure for piping members according to claim 5, wherein:
    the at least one elastic body is a single elastic body; and
    said flanges collectively define a groove therebetween for accommodating the single elastic body.

9. A connecting structure for piping members according to claim 8, wherein outer diameters of the flanges approximate a corresponding diameter of each of said first and second radially outward walls.

10. A connecting structure for piping members according to claim 5, wherein said through hole in said partition includes a bore which approximates a corresponding bore of each of said first and second channels.

11. A connecting structure for piping members according to claim 5, wherein a length between end surfaces of said sleeve is approximately equal to combined depths from the first joint surface to a bottom of said first annular groove and from the second joint surface to a bottom of said second annular groove.

12. A connecting structure for piping members according to claim 11, wherein said partition is accommodated in said first and second recesses when the first and second piping members are mutually connected.

13. A connecting structure for piping members according to claim 12, wherein a width of said partition is approximately equal to combined depths from the first joint surface to a bottom of said first recess and from the second joint surface to a bottom of said second recess, thereby allowing said first and second joint surfaces to be brought into confronting engagement when the first and second piping members are mutually connected.

\* \* \* \* \*